United States Patent [19]
Mori

[11] 3,806,740
[45] Apr. 23, 1974

[54] TIMING CONTROL DEVICE HAVING A MONOSTABLE MULTIVIBRATOR

[75] Inventor: Yasunori Mori, Hitachi, Japan

[73] Assignee: Hitachi, Ltd., Tokyo, Japan

[22] Filed: Mar. 15, 1973

[21] Appl. No.: 341,402

[30] Foreign Application Priority Data
Mar. 15, 1972 Japan.............................. 47-25663

[52] U.S. Cl.................. 307/273, 307/265, 307/294
[51] Int. Cl. ............................................. H03k 3/10
[58] Field of Search .......... 307/273, 293, 294, 265; 328/207

[56] References Cited
UNITED STATES PATENTS

| | | | |
|---|---|---|---|
| 2,976,432 | 3/1961 | Geckle, Jr............................ | 307/294 |
| 3,453,453 | 7/1969 | Hughes................................ | 307/273 |
| 3,445,788 | 5/1969 | Camenzind......................... | 307/273 |
| 3,569,743 | 3/1971 | Baessler.............................. | 307/273 |
| 3,651,345 | 3/1972 | Lundgreen.......................... | 307/293 |
| 3,711,729 | 1/1973 | Quiogue.............................. | 307/273 |

Primary Examiner—Stanley D. Miller, Jr.
Attorney, Agent, or Firm—Craig and Antonelli

[57] ABSTRACT

A timing control device changes linearly an output timing for controlling the ignition timing of an engine in response to the value of an input voltage, by changing the trigger timing of a power control thyristor of an electric power supply, etc. The timing control device includes a monostable multivibrator having a charge-discharge circuit and a first and a second current control means for keeping each of the charge and the discharge currents at a constant value, respectively, independent of variations of an applied trigger period, when the input voltage is constant. When the input voltage is changed, one of the discharge current and the charge current is linearly changed in response to the input voltage variation and the other is changed so as to keep the sum of these currents at a constant value.

10 Claims, 3 Drawing Figures

TIMING CONTROL DEVICE HAVING A MONOSTABLE MULTIVIBRATOR

BACKGROUND OF THE INVENTION

1. Field of the Invention

This invention relates to a timing control device suitable for controlling the advance of ignition timing or trigger timing of a power control thyristor of an electric power supply and the like.

2. Description of the Prior Art

There is no conventional simple circuit for controlling linearly the ignition timing of an engine or the trigger timing of power control thyristors in response to an output from a calculating device for ignition advance of the engine or electric power supplied to a load. The conventional timing control device operates nonlinearly in response to input signals from the calculating means. It is desirable to control linearly the timing in response to the calculated input, in order to improve the accuracy of the ignition timing of an engine or power supplied to a motor.

One of the simplest circuits for a timing control device makes use of a monostable multivibrator. But a conventional monostable multivibrator has a significant disadvantage. The "on" stage of the conventional monostable multivibrator responsive to an applied trigger is determined by the discharge time determined by a charge capacitor and a discharge resistance. Then, the "on" stage time is independent of the applied trigger period. In the case where a monostable multivibrator is used in the timing control device, the "on" stage time must be changed in response to the applied trigger period. Namely, the ratio of the "on" stage of the monostable multivibrator to the applied trigger period must be constant independent of the variation of the trigger period.

SUMMARY OF THE INVENTION a. Object of the Invention

The primary object of this invention is to provide a timing control device having a monostable multivibrator, in which a ratio of the "on" or "off" stage of the monostable multivibrator to an applied trigger period is independent of variations of the trigger period.

The second object of this invention is to provide a timing control device having a monostable multivibrator, in which a ratio of the "on" or "off" stage to an applied trigger period is changed linearly in response to the value of an input analog signal.

b. Statement of the Invention

In this specification, "the on stage" of the multivibrator is the stage started in response to an applied trigger time and ended at the end of the discharge of a charge-discharge circuit of the multivibrator, and the other stage is the "off stage."

The monostable multivibrator of the present invention has two current control means for controlling the charging current and the discharging current of the charge-discharge circuit. When an input analog signal is at a constant value, the charging and discharging currents of the charge-discharge circuit are kept at a constant value, respectively, by the operations of the two current control means.

If the value of the analog signal is changed, one of the charge and discharge currents of the charge-discharge circuit is changed in response to the variation of the analog signal and the other is changed by the current control means so as to keep constant the sum of the charge and discharge currents.

The present invention has a third control means which detects the charge and discharge currents and delivers an output to the current control means for determining the current value of the other.

The third control means has a current summing means and a voltage regulating means. The current summing means detects the sum value of the charge and discharge currents and generates an output voltage representing the summing value of the charge and discharge currents. The voltage regulating means detects the output voltage and delivers the output to the current control means so as to keep the output voltage representing the summing value of the charge and discharge currents constant.

The ratio of the "on" or "off" stage time of the monostable multivibrator to the applied trigger period is changed linearly in response to a variation of an input analog signal, when the one of the charge and discharge currents is changed in response to the variation of the input signal and the other is changed so as to keep the sum current of the charge and discharge currents constant.

DETAILED DESCRIPTION OF THE PREFERRED EMBODIMENT

Figure 1:
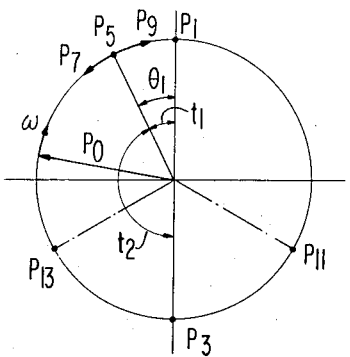
FIG. 1 is a timing chart for explaining the relationship between the input trigger timing which triggers the timing control device of the present invention and the output timing caused by the timing control device of the present invention.

FIG. 1 shows a timing chart for explaining the relationship between the advance angle of ignition and the engine rotation of a multicylinder engine, where each piston is connected in series and rotated in phase 180° from each other. The engine rotation or the engine stroke may be represented by a rotating vector $P_0$ which is revolving with an angular velocity $\omega$. When the rotating vector $P_0$ reaches a point $P_1$, the piston is at the top position in the cylinder, and when the vector $P_0$ reaches a point $P_3$, the piston is at the bottom position. One piston moves to the point $P_3$ from the point $P_1$ during combustion and another piston of the multicylinder engine starts to compress fuel mixed air to the point $P_1$ from the point $P_3$. Namely, as one piston reaches the point $P_1$, the next piston starts to compress the mixed air.

The advance angle $\theta_1$ of ignition is defined by an engine condition, such as engine speed, the ratio of the gas-air mixture, etc.

When the rotating vector reaches the point $P_3$, the timing control device of the present invention, which triggers the ignition circuit for the engine, is actuated by an applied trigger from a suitable device. When the rotating vector reaches the point $P_5$, the timing control device causes an output for triggering the ignition circuit. Namely, the output of the timing control device is generated at the advance angle $\theta_1$, which is also represented by the ratio $\theta/180$.

If the engine speed is changed, the advance ratio $\theta/180$ must be shifted. Since the relationship between the advance ratio and the engine speed is complicated and the advance ratio is dependent upon other various factors, the advance angle or ratio which is suitable for the instantaneous engine condition is calculated by other calculating means, for example, the arrangement disclosed in copending application Ser. No. 334,401, filed Feb. 21, 1973, entitled "Computing Device for an Interpolation" by Takeo Sasayama. Then, the timing control device receives the analog signal representing the advance angle. It is suitable that the point $P_5$ for generating the trigger signal is shifted linearly in response to the input analog signal and, when the input analog signal is kept at a constant value, the point $P_5$ is kept at a certain point independent of the engine speed. It is required to keep the advance angle or advance ratio $\theta_1/180$ at a constant value independent of the trigger period determined by engine speed, when the input analog signal is constant.

The above explanation relates to a multicylinder engine having 180° phase, but there are various other engines, for example, a multicylinder engine having 120° phase, where the difference angle between each cylinder is 120°. In this case the timing control device is triggered at every 120° angle. When the rotating vector $P_0$ reaches points $P_1$, $P_{11}$ and $P_{13}$, the timing control device is triggered by an appropriate circuit.

The trigger of the power control circuit is explained using FIG. 1. In general, an alternating current or voltage is represented by a rotating vector. It is assumed that the rotating vector $P_0$ represents an alternating voltage. In this case the A.C. voltage has a positive value as it moves to the point $P_1$ from the point $P_3$ through the point $P_5$ and a negative value as it moves to the point $P_3$ from the point $P_1$. When the rotating voltage reaches point $P_5$, the first thyristor is turned on. The output power from the first thyristor corresponds to the area defined by points $P_1$, 0 and $P_5$. The output power is changed by shifting the point $P_5$, which is shifted linearly by the input analog signal. When the rotating vector has reached the point $P_3$ from the point $P_1$ through the point $P_{11}$, the second thyristor is switched on at the timing defined by the input analog signal.

If the thyristors are provided so as to respond to a three phase alternating voltage, the timing control device is triggered at points $P_1$, $P_{11}$ and $P_{13}$.

Figure 2:
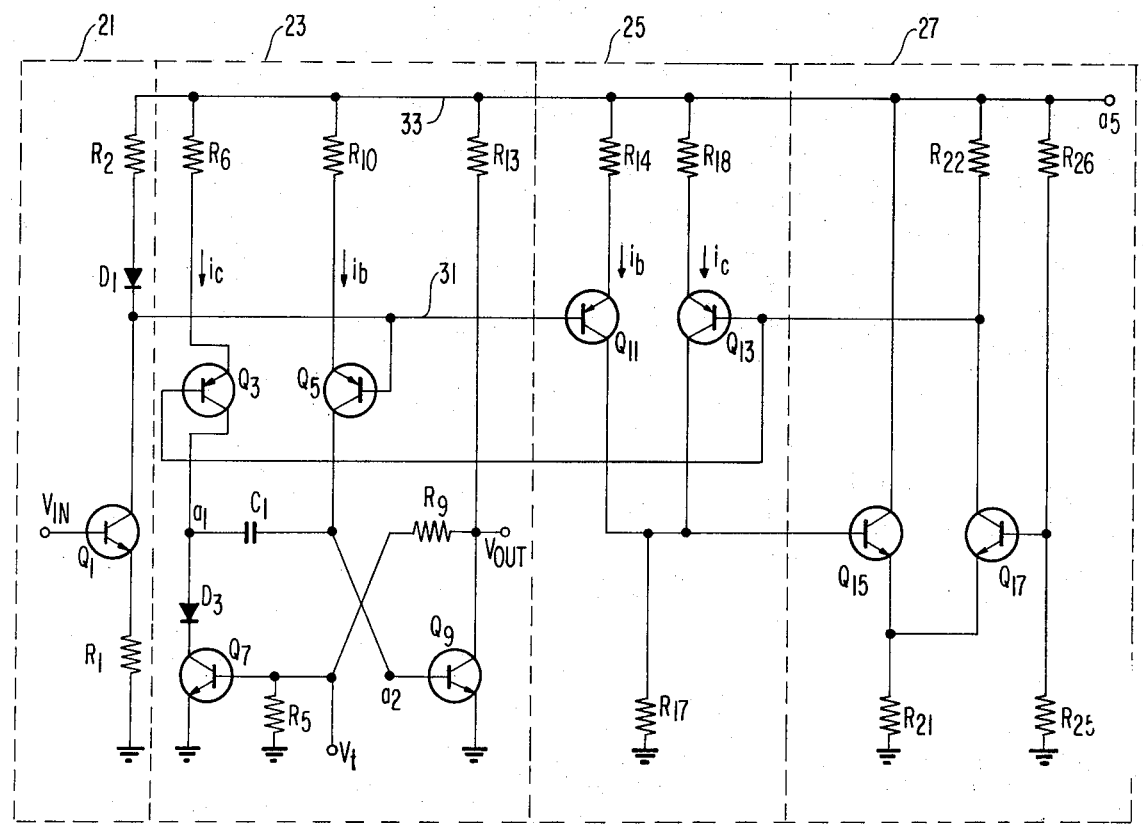
FIG. 2 is a circuit of an embodiment of the present invention.

FIG. 2 shows an embodiment of a circuit which controls linearly the timing output in response to the input analog signal, and which comprises four blocks: an input circuit 21, an output circuit 23, a current summing circuit 25, and a voltage regulating circuit 27.

The input circuit 21 comprises a transistor $Q_1$, a diode $D_1$ and two resistors $R_1$ and $R_2$, and amplifies or shifts the level of the input analog signal. The output of the input circuit 21 is applied to the base of a transistor $Q_5$ through a line 31. The input circuit 21 is not always necessary. It is possible to apply the input analog signal directly to the line 31. The output circuit 23 comprises a monostable multivibrator including two transistors $Q_7$ and $Q_9$, a diode $D_3$, a capacitor $C_1$ and resistors $R_5$, $R_6$, $R_9$, $R_{10}$ and $R_{13}$, and two current control transistors $Q_3$ and $Q_5$. The current summing circuit 25 has two transistors $Q_{11}$ and $Q_{13}$ and three resistors $R_{14}$, $R_{17}$ and $R_{18}$. The voltage regulating circuit 27 has two transistors $Q_{15}$ and $Q_{17}$ and four resistors $R_{21}$, $R_{22}$, $R_{25}$ and $R_{26}$.

Now it is assumed that the potential of the line 31 is kept constant. Since the base of the transistor $Q_{11}$ is also connected to the line 31, the base potential of transistor $Q_{11}$ is the same as that of transistor $Q_5$. The resistors $R_{14}$ and $R_{17}$ are selected so that the collector current of the transistor $Q_{11}$ is almost equal to that of the transistor $Q_5$. The bases of the transistors $Q_3$ and $Q_{13}$, and the collector of the transistor $Q_{17}$, are at the same potential because of the direct connection therebetween. The resistor $R_{18}$ is selected so that the collector current of $Q_{18}$ is almost equal to that of the transistor $Q_3$.

The current through the resistor $R_{17}$ becomes the summing value of the collector currents of transistors $Q_{11}$ and $Q_{13}$, the summing value being almost equal to the summing value of the collector currents $i_c$ and $i_b$ of the transistors $Q_3$ and $Q_5$.

The voltage regulating circuit 27 detects the voltage between the ends of the resistor $R_{17}$ which is changed in response to the summing value of the collector currents of the transistor $Q_{11}$ and $Q_{13}$, and changes the base potentials of the transistors $Q_3$ and $Q_{13}$ so as to keep the voltage between the ends of the resistor $R_{17}$ constant. Namely, the sum of the collector currents $i_c$ and $i_b$ of the transistors $Q_3$ and $Q_5$ is kept constant by controlling the base potential of transistor $Q_3$.

If the potential of the line 31 is a constant value, the base potential of the transistor $Q_3$ is kept constant. The transistors $Q_3$ and $Q_5$ (first current control means, second current control means) pass the constant currents respectively, one current being the charge current and the other being the discharge current of the capacitor $C_1$. Before applying the trigger, the transistor $Q_9$ is switched on and the transistor $Q_7$ is switched off. The capacitor $C_1$ is charged by the current $i_c$ which is provided by the transistor $Q_3$.

Figure 3:
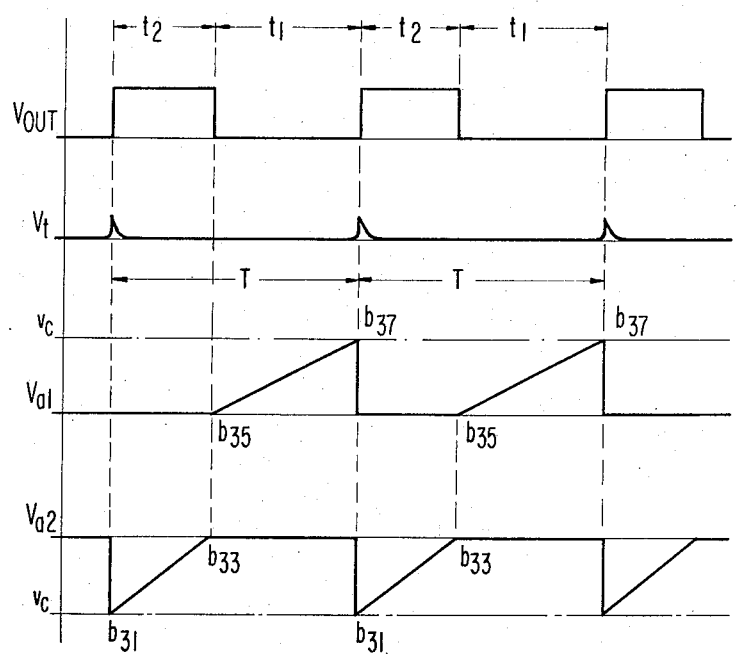
FIG. 3 is a voltage waveform diagram of the input trigger, an output and a voltage across a capacitor $C_1$ of the circuit as shown in FIG. 2.

After $t_1$ seconds, the trigger is applied to a terminal $V_t$ from an external circuit (not shown) which changes the state of the transistors $Q_7$ and $Q_9$. The stored voltage $v_c$ of the capacitor $C_1$ is given by $$v_c = 1/C \cdot i_b \cdot t_1 \qquad (1)$$

where C is the capacitance of the capacitor $C_1$. Referring to FIG. 3, since the collector current $i_c$ of the transistor $Q_3$ is a constant value, the line to point $b_{37}$ from point $b_{35}$ becomes linear. When the stages of the transistors $Q_7$ and $Q_9$ are changed by the applied trigger, the charge of the capacitor $C_1$ is discharged linearly by the collector current of the transistor $Q_5$, as shown by a line between points $b_{31}$ and $b_{33}$. The discharged voltage $v_c$, which is equal to the charge voltage, is given by $$v_c = 1/C \cdot i_b \cdot t_2 \qquad (2)$$

The period of the applied trigger T is $$T = t_1 + t_2 \qquad (3)$$

Using the equations (1), (2)

$$T = v_c \cdot C/i_c + v_c \cdot C/i_b$$
$$= (i_c + i_b)/i_c \cdot i_b \cdot v_c \cdot C$$

(4) The ratio of the time $t_1$ to period $T$ is $$\frac{t_1}{T} = \frac{\dfrac{C \cdot v_c}{i_c}}{\dfrac{(i_c + i_b) \cdot v_c \cdot C}{i_c \cdot i_b}} \quad (5)$$

$$= \frac{i_b}{i_c + i_b}$$

In the equation (5), since the collector currents $i_b$ and $i_c$ of the transistors $Q_3$ and $Q_5$ are kept at a constant value, the ratio $t_1/T$ is constant. Additionally, since the collector currents $i_b$ and $i_c$ are independent of the frequency of the applied trigger, the ratio $t_1/T$ is independent of the trigger period.

Referring to FIG. 1 if the engine speed is changed, since the ratio $t_1/T$ is constant, the position $P_1$ is not shifted.

The point $P_5$ must be shifted linearly in response to an input analog signal. If the sum of the collector current $i_c$ of the transistor $Q_3$ and the collector current $i_b$ of the transistor $Q_5$ is kept at a constant value, the ratio $t_1/T$ is changed linearly in response to the current $i_b$, as shown in equation (5). The blocks 25 and 27 keep the sum of the currents $i_c$ and $i_b$ at a constant value.

Now, when the input voltage is applied to the terminal $V_{in}$, the base potential of the transistor $Q_5$ is changed. Since the sum of the currents $i_c + i_b$ is constant, as seen from equation (5), the ratio $t_1/T$, which is the timing output of the circuit of FIG. 2, is in proportion to the variation of the input analog signal.

The current summing circuit 25 generates a voltage which is in proportion to the sum of the collector currents of the transistors $Q_{11}$ and $Q_{13}$. That voltage is detected by the base of the transistor $Q_{15}$ of the voltage regulating means. If the voltage is increased, the potential of the base of the transistor $Q_{15}$ is increased and the collector current of the transistor $Q_{15}$ is increased, so as to increase the potential of the emitter of the transistor $Q_{17}$. As a result, the voltage between the base and the emitter of the transistor $Q_{17}$ is decreased and the collector potential of the transistor $Q_{17}$ which is connected to the base of the transistor $Q_{13}$ is decreased, so as to decrease the sum of the currents $i_b$ and $i_c$. Namely, the sum $(i_b + i_c)$ is kept at a constant value independent of the variation of the current $i_b$.

In the circuit of FIG. 2 the effect of temperature is considerable. When the temperature increases, the collector potential of the transistor $Q_1$ is decreased and the base potential of the transistor $Q_5$ is decreased. Since the resistance of a diode has a negative temperature coefficient, the base potential of the transistor $Q_5$ is held constant. The diode $D_3$ is also used for compensating the temperature effect. The operating lines or conditions of the transistors $Q_7$ and $Q_9$ are dependent on the temperature variation. It is necessary for this temperature effect to connect the diode $D_1$ or other device having a negative temperature coefficient between the point $a_1$ and ground.

In the circuit of FIG. 2 it is desirable that the transistors $Q_5$ and $Q_{11}$, the transistors $Q_3$ and $Q_{13}$ or the transistors $Q_{15}$ and $Q_{17}$ have the same characteristics, respectively, since the same collector currents will be generated in every pair of transistors under the same conditions.

In the above embodiment, the charge current of the charge-discharge circuit is changed by the input analog signal and the discharge current is changed so as to keep the sum of the charge and discharge currents constant. But, instead of equation (5), it is possible to use a ratio $t_2/T$. In this case the ratio $t_2/T$ is $$\frac{t_2}{T} = \frac{\dfrac{C \cdot v_c}{i_b}}{\dfrac{(i_c + i_b) \cdot v_c \cdot C}{i_c \cdot i_b}} \quad (6)$$

$$= \frac{i_c}{(i_c + i_b)}$$

Then, if the sum $(i_c + i_b)$ is kept constant, the ratio $t_2/T$ is linearly changed by the variation of current $i_c$. Namely, in the circuit of FIG. 2, it is possible that the base of the transistor $Q_3$ is connected to the line 31 and the base of the transistor $Q_5$ is connected to the base of the transistor $Q_{13}$. In this case the output from terminal V out is inverse to that of equation (5), and the same effect is obtained.

What is claimed is:

1. A timing control device comprising
    a monostable multivibrator including a charge-discharge circuit means and first and second transistors,
    first current control means connected to said charge-discharge circuit means through which the charge current of the charge-discharge circuit means flows,
    second current control means connected to said charge-discharge circuit means through which the discharge current of the charge-discharge circuit means flows,
    third control means responsive to the sum of said charging current and said discharge current for delivering an output to the second current control means to maintain the sum of the charging and discharge currents at a constant value and
    means for applying an input analog signal to said first current control means to change the charging current value in response to the value of said input analog signal,
    the output from the third control means being applied to said second current control means by which said second current control means regulates the current in response to the value of the output of said third control means.

2. A timing control device according to claim 1, wherein said third control means comprises current summing means and a voltage regulating means,
    said current summing means generating an output voltage which represents the sum of the charging and discharge currents, and said voltage regulating means detecting the output voltage of the current summing means and delivering to said second current control means an output representing the value of the discharge current, so as to maintain the output voltage of the current summing means at a constant value.

3. A timing control device in accordance with claim 2, wherein said current summing means comprises third and fourth transistors the collectors of which are connected together and a common resistor connected between the collectors of said third and fourth transistors and a voltage supply, the base of said third transistor being connected to the input terminal of said first current control means, and the base of said fourth transistor being connected to the input of said second current control means.

4. A timing control device according to claim 3, wherein said voltage regulating means includes fifth and sixth transistors the emitters of which are connected to each other and to the voltage supply through a common resistor, the base of said fifth transistor being connected to the collectors of said third and fourth transistors, and the collector of the sixth transistor being connected to the base of said fourth transistor.

5. A timing control device according to claim 4, wherein said first and second current control means comprises seventh and eighth transistors, respectively, the collector of said seventh transistor being connected to the collector of said first transistor in the monostable multivibrator, the collector of the eighth transistor being connected to the base of the second transistor of the monostable multivibrator, the charge-discharge circuit means being connected between the collectors of said seventh and eighth transistors, and a resistor being connected between the base of the first transistor and the collector of the second transistor of said multivibrator.

6. A timing control device comprising a monostable multivibrator including a charge-discharge circuit means and first and second transistors, first current control means connected to said charge-discharge circuit means through which the charging current of the charge-discharge circuit means flows, second current control means connected to said charge-discharge circuit means through which the discharge current of the charge-discharge circuit means flows, third control means responsive to the sum of said charging current and said discharge current for delivering an output to said first current control means to maintain the sum of the charging and discharge currents at a constant value, and means for applying an input analog signal to said second current control means so as to change the discharge current value in response to the value of said input analog signal, the first control means regulating the flow of the charging current to the charge-discharge circuit means in response to the output from said third control means.

7. A timing control device in accordance with claim 6, wherein said third control means comprises a current summing means and a voltage regulating means, said current summing means generating an output voltage which represents the sum of the charging and discharge currents, and said voltage regulating means detecting the output voltage of the current summing means and delivering to said first current control means an output representing the value of the charging current so as to maintain the output voltage of the current summing means at a constant value.

8. A timing control device in accordance with claim 7, wherein said current summing means comprises third and fourth transistors the collectors of which are connected together and a common resistor connected between the collectors of said third and fourth transistors and a voltage supply, the base of said third transistor being connected to the input terminal of said first current control means, and the base of said fourth transistor being connected to the input of said second current control means.

9. A timing control device according to claim 8, wherein said voltage regulating means includes fifth and sixth transistors the emitters of which are connected to each other and to the voltage supply through a common resistor, the base of said fifth transistor being connected to the collectors of said third and fourth transistors, and the collector of the sixth transistor being connected to the base of said fourth transistor.

10. A timing control device according to claim 9, wherein said first and second current control means comprises seventh and eighth transistors, respectively, the collector of said seventh transistor being connected to the collector of said first transistor in the monostable multivibrator, the collector of the eighth transistor being connected to the base of the second transistor of the monostable multivibrator, the charge-discharge circuit means being connected between the collectors of said seventh and eighth transistors, and a resistor being connected between the base of the first transistor and the collector of the second transistor of said multivibrator.

* * * * *